United States Patent [19]
Raby et al.

[11] Patent Number: 5,330,959
[45] Date of Patent: Jul. 19, 1994

[54] ENHANCED SPEED CARBONLESS PAPER

[75] Inventors: James M. Raby, Youngstown, N.Y.; Rodney E. Williams, Fremont, Ohio

[73] Assignee: Moore Business Forms, Inc., Grand Island, N.Y.

[21] Appl. No.: 17,989

[22] Filed: Feb. 16, 1993

Related U.S. Application Data

[60] Division of Ser. No. 888,383, May 22, 1992, abandoned, which is a continuation of Ser. No. 602,619, Oct. 24, 1990, abandoned.

[30] Foreign Application Priority Data

Oct. 27, 1989 [JP] Japan .................................. 1-280226
Nov. 28, 1989 [JP] Japan .................................. 1-306621

[51] Int. Cl.$^5$ ........................ B41M 5/124; C08G 8/28
[52] U.S. Cl. ................................... 503/201; 503/211; 503/216; 503/226; 427/146; 427/146; 427/150; 430/138
[58] Field of Search ............... 503/201, 211, 216, 226; 428/327; 427/150, 145, 146

[56] References Cited

U.S. PATENT DOCUMENTS

| | | | |
|---|---|---|---|
| 4,461,495 | 7/1984 | Nakasato et al. | 503/211 |
| 4,513,301 | 4/1985 | Takayama et al. | 503/226 |
| 4,583,103 | 4/1986 | Hayashi et al. | 503/226 |
| 4,598,035 | 7/1986 | Usami et al. | 503/226 |
| 4,612,254 | 9/1986 | Ginter et al. | 503/211 |
| 4,943,554 | 7/1990 | Macaulay | 503/201 |
| 5,017,546 | 5/1991 | Brinkman et al. | 427/146 |
| 5,034,370 | 7/1991 | Saeki et al. | 503/211 |

FOREIGN PATENT DOCUMENTS 0070146 1/1983 European Pat. Off. .

Primary Examiner—Paul R. Michl
Assistant Examiner—Tae H. Yoon
Attorney, Agent, or Firm—Finnegan, Henderson, Farabow, Garrett & Dunner

[57] ABSTRACT

A coating composition for use in carbonless copying systems including (1) a resin dispersion which is a phenol/aldehyde condensation product formed by the interaction of an alkyl-substituted salicylic acid, an alkyl-substituted phenol, an aldehyde and a metal source; (2) a binder; and (3) a pigment. This coating composition provides faster imaging in carbonless systems than conventional coatings, at temperatures below room temperature.

2 Claims, No Drawings

ENHANCED SPEED CARBONLESS PAPER

This application is a division of application Ser. No. 07/888,383 filed May 22, 1992, now abandoned, which was a continuation of application Ser. No. 07/602,619, filed Oct. 24, 1990, now abandoned.

FIELD OF THE INVENTION

The present invention relates to carbonless copying systems, and more specifically, to compositions for use with coated front (CF) paper, which compositions provide enhanced image development speed for carbonless paper at below room temperature.

BACKGROUND OF THE INVENTION

Standard carbonless copying systems or pressure sensitive copying paper include a plurality of substrates, e.g., paper sheets, arranged in a manifold, each sheet having one or more coatings on a surface thereof. The manifold is designed so that when external pressure caused by a typewriter, pen, or other instrument is applied to the outermost sheet, a colored image will be formed on at least one surface of each sheet of the manifold.

The top sheet of the manifold to which the pressure is applied has a coating on its back surface. This coated back surface typically includes microcapsules containing an initially colorless chemically reactive color-forming dye precursor as the fill material. The front surface of the next sheet, which is adjacent to the back surface of the top sheet, is coated with a material containing a component, such as phenolic resin or reactive clay, that is capable of reacting with the colorless dye precursor contained in the microcapsules to produce a color. Thus, an external pressure on the front surface of the top sheet will rupture the microcapsules on the back surface and release the colorless dye precursor which then chemically reacts with the reactive component of the coated front of the adjacent sheet to produce a colored image corresponding to the area of pressure. Similarly, colored images are produced on each successive sheet of the manifold by the external pressure rupturing the microcapsules carried on the bottom surface of each sheet.

The sheets of the carbonless copying system manifold are designated in the art by the terms CB for "coated back," CFB for "coated front and back," and CF for "coated front." The CB or transfer sheet is usually the top sheet of the manifold and the sheet to which the external pressure is applied. The CFB sheets are the intermediate sheets of the manifold, each of which is able to have an image formed on its front surface by a pressure, and each of which also transmits the contents of ruptured microcapsules from its back surface to the front surface of the next sheet. The CF or recording sheet is the bottom sheet and is coated only on its front surface so that an image can be formed on it.

While it is customary to have the coating containing the microcapsules on the back surface of the sheets and to have the coating containing the reactive component for the capsules on the front surface of each of the sheets, the reverse arrangement is also possible. In addition, one of the reactive ingredients may be carried in the sheets themselves, rather than applied as surface coatings. Furthermore, the component that reacts with the colorless dye precursor may also be microencapsulated.

The use of carbonless copying paper has recently been extended to the outdoors or to a room which may be influenced by the temperature of the outdoors. There now exists a need for a carbonless copying system that maintains its performance, particularly speed and density of color development, in any environment including the low temperatures that can be experienced outdoors. Typical examples of applications wherein such use is contemplated include use of outdoor gasoline station credit cards, outdoor use of credit cards for food (e.g., pizza) delivery, outdoor police or fire record logging, etc.

Currently, a zincated alkylphenol novolac resin dispersion sold under the trademark name HRJ-2456 and manufactured by Schenectady Chemicals, Inc. of Schenectady, N.Y., is used by applicant in its carbonless sets and has been found to be somewhat deficient at producing rapid images at below room temperatures.

Accordingly, it is an object of the present invention to provide a composition which can be applied to one sheet of a carbonless copying system to provide rapid imaging upon contact with a dye precursor.

It is another object to provide a composition which can be applied to at least one sheet of a carbonless copying system to provide images of high density upon contact with a dye precursor.

It is a further object of the invention to provide a composition which can be applied to at least one sheet of a carbonless copying system to enable effective operation of the carbonless system at lower than room temperature.

SUMMARY OF THE INVENTION

The applicant of the present invention has unexpectedly found that a carbonless copying system CF coating incorporating a resin which is a phenol/aldehyde condensation product produced by the interaction of an alkyl-substituted salicylic acid, an alkyl-substituted phenol, an aldehyde and a metal source; along with a binder and a pigment; provides faster imaging than standard CF coatings which contain HRJ-2456, especially at temperatures below room temperature.

Accordingly, to achieve the foregoing objects, and in accordance with the invention as embodied and broadly described herein, the present invention provides a coating composition for use in carbonless copying systems. The composition comprises a phenol/aldehyde condensation product produced by the interaction of an alkyl-substituted salicylic acid, an alkyl-substituted phenol, an aldehyde and a metal source; a binder; and a pigment, wherein the composition is capable of providing enhanced image development at temperatures below 40° F.

The present invention also provides a carbonless copying system comprising a recording substrate; a first image-forming component which is a mixture of (1) a phenol/aldehyde condensation product resin formed by the interaction of an alkyl-substituted salicylic acid, an alkyl-substituted phenol, an aldehyde and a metal source, (2) a binder, and (3) a pigment; and a complementary image-forming component, encapsulated in microcapsules and capable of reacting with the first image-forming component to produce a colored reaction product; the first image-forming component and the complementary image-forming component are arranged in juxtaposed contact with one another whereby the application of pressure in selected areas upon the carbonless system causes a colored image to form on corresponding areas of the recording substrate, wherein the system is capable of providing enhanced image development at temperatures below 40° F.

The present invention also provides a carbonless copying system comprising a recording substrate; a transfer substrate; a first image-forming component which is a mixture of (1) a phenol/aldehyde condensation product resin formed by the interaction of an alkyl-substituted salicylic acid, an alkyl-substituted phenol, an aldehyde and a metal source, (2) a binder, and (3) a pigment and is carried by the recording substrate; a complementary image-forming component encapsulated in microcapsules carried by the transfer substrate and capable of reacting with the first image-forming component to produce a colored reaction product; and the first image-forming component is arranged in juxtaposed contact with the complementary image-forming component whereby the application of pressure in selected areas upon the carbonless system causes colored images to form on corresponding areas of the recording substrate. The system is capable of providing enhanced image development at temperatures below 40° F.

The present invention also provides a method of using the carbonless copy system of this invention at temperatures below room temperature, including temperatures below 40° F.

DETAILED DESCRIPTION OF THE INVENTION

References will now be made in detail to the presently preferred embodiments of the invention, which are illustrated in the foregoing examples.

In accordance with the present invention, there is provided a coating composition for use in carbonless copying systems. The composition comprises a resin which is a phenol/aldehyde condensation product produced by the interaction of an alkyl-substituted salicylic acid, an alkyl-substituted phenol, an aldehyde and a metal source; a binder; and a pigment. Preferably, the coating composition is applied to a coated front (CF) sheet in a carbonless copying manifold.

It is believed by applicant that the phenol/aldehyde condensation product resin of the present invention is disclosed by European Patent Application 0,338,808, which corresponds to U.S. Pat. No. 5,017,546 to Brinkman et al., both of which are herein incorporated by reference. U.S. Pat. No. 5,017,546 EPA 0,338,808 are expressly incorporated by reference for disclosing this resin and a process for making this resin.

As disclosed in EPA 0,338,808, preferably, the alkyl-substituted salicylic acid is substituted with at least one alkyl group containing three or more carbon atoms. More preferably, the alkyl group contains at least four carbon atoms, even more preferably, four to twelve carbon atoms. Particularly useful are salicylic acids of the formula I:

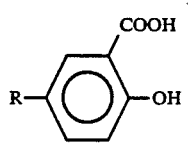

where R is an alkyl group containing from four to twelve carbon atoms. In particular, the group R is preferably octyl or nonyl, especially tertiary-octyl (derived from di-isobutene) and nonyl (derived from propylene trimer). The group R may also be a dodecyl group. The preferred group is the nonyl group.

The alkylphenol component preferably contains at least one alkyl group containing at least three carbon atoms, more preferably, four to twelve carbon atoms. Preferably, the phenols are phenols substituted in the para-position with an alkyl group containing four to twelve carbon atoms, particularly tertiary-butyl, tertiary-octyl, nonyl (derived from propylene trimer) and dodecyl. The preferred material is the tertiary-octyl group. The alkyl substituted group in the para position is represented by R' in formula II below.

The aldehyde is preferably formaldehyde, although the formaldehyde may be supplied, for example, from paraformaldehyde or a similar source of formaldehyde.

The preferred metal source is zinc oxide.

The exact composition of the product is not known, but it is believed to have the general formula II:

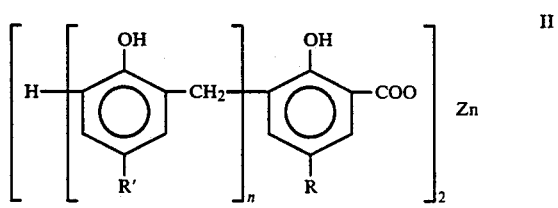

The phenol/aldehyde condensation product may be synthesized by combining and heating the alkyl-substituted salicylic acid, the alkyl-substituted phenol, the aldehyde, the metal source and water.

EPA 0,338,808 discloses a general example of a suitable manufacturing process: 750 parts nonylsalicylic acid, 523 parts p-t-octylphenol, 199. parts 50% formaldehyde solution, 3 parts of DAXAD 30 (a wetting agent of proprietary composition available from W. R. Grace & Co.), 69 parts water and 103 parts of zinc oxide are heated to reflux with agitation. After the reaction takes place, heating is discontinued and additional wetting agent is added. The mixture is cooled with agitation, and further diluted with water. The mixture is then filtered to obtain the phenol/aldehyde condensation product.

Preferably, the resin dispersion which is a component of the coating composition of the invention may be HRJ-10176 or HRJ-10802, which are trademark names of resins manufactured and supplied by Schenectady Chemicals, Inc. of Schenectady, N.Y. Applicant has been informed by Schenectady Chemicals, Inc. that HRJ-10176 and HRJ-10802 are each within the scope of the description and/or the claims of the phenol/aldehyde condensation product of EPA 0,338,808.

In accordance with the invention, the resin component of the coating composition of the invention is preferably present in an amount ranging from 7 to 40 parts, more preferably from 10 to 20 parts, per 100 parts of the pigment and resin. Unless otherwise stated, "parts" in this invention are parts by weight.

The pigment component of the coating composition of the present invention can be any of those pigments known to be useful in coating compositions for carbonless copying paper. Specifically, the pigments can be selected from, for example, ANSILEX (Kaolin product manufactured by Engelhard), HYDRAL (hydrated alumina manufactured by Alcoa), M-60 (calcium carbonate —70% dispersion in water manufactured by Mississippi Lime Co.) and EXSILON (Kaolin product manufactured by Engelhard). The pigment is used in an amount preferably ranging from 60 to 93 parts, more preferably from 80 to 90 parts, per 100 parts of the pigment and resin.

The binder component of the coating composition of the present invention can be any of those binders known to be useful in coating compositions for carbonless copying paper. Specifically, the binders can be selected from, for example, Penford Gum (PG) 290, Penford Gum (PG) 380 (both manufactured by Pennick and Ford) and latex. The binder is used in an amount of preferably ranging from 5 to 25 parts, more preferably from 10 to 20 parts, per 100 parts of the pigment and resin.

Other components can be present in the coating composition of the present invention. These may include, for example, dispersing agents, such as, TAMOL 850 (anionic polymer-type dispersing agent) and COLLOID 230 (dispersing agent manufactured by Colloids, Inc.); ph adjustment agents, such as, ammonia 26° Be (alkaline pH adjuster); and cross-linking agents, such as, SUNREZ 700 m (a starch cross-linking agent manufactured by Sun Chemicals, Inc.).

In accordance with the invention, a carbonless copying system is further provided. The carbonless copying system includes a recording substrate, a first image-forming component, and a complementary image-forming component. The first image-forming component in accordance with the invention is a mixture of a resin dispersion which is a phenol/aldehyde condensation product formed by the interaction of an alkyl-substituted salicylic acid, an alkyl-substituted phenol, an aldehyde and a metal source; a binder; and a pigment. As described earlier herein, the resin may preferably be HRJ-10176 or HRJ-10802. The complementary image-forming component is encapsulated in microcapsules and is capable of reacting with the first image-forming component to produce a colored reaction product. The first image-forming component and the complementary image-forming component are arranged in juxtaposed contact with one another whereby the application of pressure in selected areas upon the carbonless system causes a colored image to form on corresponding areas of the recording substrate.

In accordance with the invention, the complementary image-forming component is preferably a colorless dye precursor encapsulated in microcapsules. Representative colorless dye precursors that can be utilized as the complementary image-forming component include, for example, crystal violet lactone, benzol leucomethylene blue, rhodamine lactam, the p-toluene sulfonate of Michler's hydrol, and any of the various chromogenic compounds that are capable of changing from a colorless to a colored form on contact with an acidic substance.

In accordance with the invention, the microcapsules utilized for enveloping the dye precursor material may comprise a shell or wall of polymeric material, may have generally continuous walls and may range from about 0.1 to about 500 microns in diameter. Preferably, the complementary image-forming component is carried by a transfer substrate which is in Juxtaposed contact with the recording substrate. The image-forming component may be adhered to the transfer substrate by utilizing a known binder.

In accordance with the invention, the recording substrate and the transfer substrate are arranged adjacent to one another so that the first image-forming component and the complementary image-forming component are in juxtaposed, i.e., pressure sensitive, contact with respect to one another. When pressure is applied to the transfer substrate at locations corresponding to areas containing the complementary image-forming component, microcapsules of the complementary image-forming component are ruptured and the contained dye precursor is released to contact and react with the first image-forming component on the recording substrate to form a standard colored image thereon.

In accordance with the invention, both the first image-forming component and the complementary image-forming component can be applied to the recording substrate. In addition, a transfer substrate can be utilized wherein the complementary image-forming component is carried on the transfer substrate and a first image-forming component is carried by the recording substrate. Thus, the external pressure is necessary to cause the microcapsules containing the complementary image-forming component to rupture may be applied to either the recording substrate itself, or in the embodiment utilizing the transfer substrate, to the transfer substrate.

In accordance with the invention, the carbonless copying system of the invention may also contain a plurality of intermediate substrates, or CFB (coated front and back) sheets, located between the transfer substrate and the recording substrate. These intermediate CFB substrate sheets are coated on the front side of the recording substrate with the first image-forming component (corresponding to the component on the recording substrate) and are also coated on the back side with the complementary image-forming component (corresponding to the component on the transfer substrate). Thus, the intermediate sheets are capable of functioning as both recording and transfer sheets by forming the colored reaction products on their front side like the recording substrate, and they also enable the transfer of the complementary image-forming components to successive sheets, like the transfer substrate. This enables the formation of multiple copies of sheets, each sheet containing the standard colored images.

The specific examples below will enable the invention to be better understood. However, they are given by way of guidance and do not imply any limitations.

The coating compositions of the examples were applied to the recording substrate by utilizing a hand drawdown with a wire round rod. A slurry was placed on the paper and the wire round rod was pulled across the surface of the paper by hand to spread the slurry coating. After the substrate was coated, the substrate was placed in a drying oven until the coating reached ambient humidity.

EXAMPLE 1

The following CF formulations were prepared and coated as described above at 6.7 grams per square meter (gsm) on 12 lb. Boise East Coast bond:

|  | Dry | Wet |
|---|---|---|
| A. Standard CF Coating | | |
| ANSILEX | 20.02 | 40.04 |
| HYDRAL 710-b | 65.46 | 100.70 |
| TAMOL 850 | 1.30 | 4.34 |
| $H_2O$ | — | 29.51 |
| HRJ-2456 | 16.42 | 30.30 |
| PG 290 | 22.0 | 73.33 |
| | 125.20 | 278.22 |

-continued

|  | Dry | Wet |
|---|---|---|
| B. Enhanced Speed CF Coating of the Present Invention | 45% Solids | |
| ANSILEX | 20.02 | 40.04 |
| HYDRAL 710-B | 65.46 | 100.7 |
| TAMOL 850 | 1.30 | 4.34 |
| H₂O | — | 26.6 |
| HRJ-10176 | 16.42 | 33.21 |
| PG 290 | 22.0 | 73.33 |
|  | 125.20 | 278.22 |
|  | 45% Solids | |

The above CF coatings were mated to standard microcapsule CB paper and imaged using a standard calendar tester at 70° F. and 32° F. The % reflectance of the image thus produced was determined using a Photovolt at 30 seconds, 5 minutes, 20 minutes, and 24 hours after imaging. The lower the % reflectance, the darker the image. The results are shown below in Table 1.

TABLE 1

|  | % Reflectance 70° F. | | | |
|---|---|---|---|---|
|  | 30 sec. | 5 min. | 20 min. | 24 hrs. |
| Standard CF coating (HRJ-2456) | 64.6 | 54.9 | 53.1 | 52.5 |
| Enhanced speed CF coating (HRJ-10176) | 54.9 | 54.2 | 53.4 | 52.9 |
|  | 32° F. | | | |
|  | 30 sec. | 5 min. | 20 min. | 24 hrs. |
| Standard CF coating (HRJ-2456) | 90.5 | 79.1 | 58.7 | 57.0 |
| Enhanced speed CF coating (HRJ-10176) | 80.5 | 59.9 | 54.7 | 55.7 |

Table 1 illustrates that the enhanced speed CF coating of the present invention (HRJ-10176 resin) provides for faster imaging than the standard CF coating (HRJ-2456 resin), both at room temperature and at 32° F. However, as can be seen from Table 1, the faster imaging is more pronounced at 32° F. It can be seen that, at 32° F., it takes 5 minutes for carbonless paper utilizing the resin of the invention to form an image having a % reflectance of 59.9. Using a standard CF coating, the % reflectance is 79.1 after 5 minutes, and it takes 20 minutes to form an image having a % reflectance of 58.7.

EXAMPLE 2

| Low Cost Pigment Composition | | |
|---|---|---|
|  | Dry | Wet |
| EXSILON | 58.86 | 102.14 |
| M-60 | 32.3 | 49.59 |
| Water | — | 35.08 |
| COLLOID 230 | 1.61 | 3.98 |
| Ammonia 26 Be | — | 0.67 |
| Resin | 17.85 | 35.61 |
| PG 380 | 13.91 | 49.85 |
| SUNREZ 700 m | 0.44 | 1.06 |
|  | 125.00 | 278.00 |

The following compounds were utilized as the "resin" in the above composition.
1) HRJ-2456 (Control)
2) HRJ-10176 (production sample)
3) HRJ-10802

The above three compositions were tested with a low pressure calendar tester at 68° F. and 32° F. and the % reflectance was measured. The results appear in Table 2 below.

TABLE 2

| CF | % Reflectance 68° F. | | | |
|---|---|---|---|---|
|  | 30 sec. | 5 min. | 20 min. | 24 hrs. |
| HRJ-2456 | 72.2 | 55.4 | 53.2 | 53.1 |
| HRJ-10176 | 60.2 | 55.1 | 54.1 | 53.2 |
| HRJ-10802 | 57.3 | 53.0 | 52.5 | 51.1 |
|  | % Reflectance 32° F. | | | |
|  | 30 sec. | 5 min. | 20 min. | 24 hrs. |
| HRJ-2456 | 92.1 | 81.3 | 59.9 | 57.8 |
| HRJ-10176 | 81.3 | 60.3 | 55.1 | 56.0 |
| HRJ-10802 | 80.9 | 59.8 | 53.1 | 52.9 |

It can be seen from Table 2 that both HRJ-10176 and HRJ-10802, in accordance with the invention, provide faster imaging than conventional HRJ-2456 at room temperature and also at 32° F. As in Example 1, the faster imaging is more pronounced at 32° F. For example, it takes 20 minutes for the HRJ-2456 formulation to achieve a % reflectance of 59.9, while the HRJ-10802 has a % reflectance of 59.8 after 5 minutes.

EXAMPLE 3

Testing of Production HRJ-10176 Resin

A production sample (55 gal drum) of HRJ-10176 was used for testing in the lab (compared to a sample of HRJ-2456 and lab sample of HRJ-10176).

| Material | Dry | Wet |
|---|---|---|
| Comparative-HRJ-2456 | | |
| ANSILEX | 20.02 | 40.04 |
| HYDRAL 710B | 65.46 | 100.70 |
| TAMOL 850 | 1.30 | 4.34 |
| Water | — | 29.01 |
| HRJ-2456 | 16.42 | 30.80 |
| PG 290 | 22.00 | 73.33 |
|  | 125.20 | 278.22 |
| 45% solids - coated on 12 lb Boise Bond 7.6 g/m² | | |
| Control Lab Sample HRJ-10176 | | |
| ANSILEX | 20.02 | 40.04 |
| HYDRAL 710B | 65.46 | 100.70 |
| TAMOL 850 | 1.30 | 4.34 |
| Water | — | 29.01 |
| Lab Batch HRJ-10176 | 16.42 | 30.80 |
| PG 290 | 22.00 | 73.33 |
|  | 125.20 | 278.22 |
| 45% solids - coated on 12 lb Boise Bond 7.7 g/m² | | |
| Production Sample HRJ-10176 | | |
| ANSILEX | 20.02 | 40.04 |
| HYDRAL 710B | 65.46 | 100.70 |
| TAMOL 850 | 1.30 | 4.34 |
| Water | — | 29.01 |
| Prod. HRJ-10176 | 16.42 | 30.80 |
| PG 290 | 22.00 | 73.33 |
|  | 125.20 | 278.22 |
| 45% solids - coated on 12 lb Boise Bond 7.7 g/m² | | |

The three resin CF compositions were imaged at room temperature using a microcapsule coated CB paper. The results are shown below in Table 3.

TABLE 3

| CF | % Reflectance | | |
|---|---|---|---|
|  | 30 sec. | 5 min. | 20 min. |
| HRJ-2456 (control) | 72.30 | 53.50 | 52.20 |
| HRJ-10176 (lab) | 55.20 | 52.00 | 52.00 |

TABLE 3-continued

| CF | % Reflectance | | |
|---|---|---|---|
|  | 30 sec. | 5 min. | 20 min. |
| HRJ-10176 (prod) | 55.40 | 54.50 | 53.50 |

The results show that the production material of HRJ-10176 is similar to that of a lab sample, and both show improved results over HRJ-2456.

Although applicant does not wish to be bound by any theory of the chemistry involved in the invention, it is postulated that the improved results achieved by the resin of the invention (e.g., HRJ-10176 and HRJ-10802) over the prior art resin (HRJ-2456) may be due to the fact that the resin of the invention is a condensation product of a salicylic acid. Salicylic acid may act as an enhancer to assist the dye in reacting with the resin.

Although the present invention has been described in connection with the preferred embodiments, it is to be understood that modifications and variations may be resorted to without departing from the spirit and scope of the invention. Such modifications are considered to be within the purview and scope of the invention and the appended claims.

What is claimed is:

1. A method of using a coating composition in a carbonless copying system at temperatures below 40° F., said carbonless copying system including a transfer substrate, a recording substrate, an image-forming component carried in microcapsules by said transfer substrate and a coating composition carried by said recording substrate, said coating composition comprising:
a resin dispersion which is a phenol/aldehyde condensation product formed by the interaction of alkyl-substituted salicylic acid, an alkyl-substituted phenol, an aldehyde and a metal source;
a binder; and
a pigment,
said method comprising applying pressure in selected areas upon the transfer substrate at temperatures below 40° F. to cause said microcapsules to rupture, thereby allowing the microencapsulated image-forming component to contact said coating composition to form a colored image on corresponding areas of the recording substrate.

2. A method of reproducing an image at temperatures below 40° F. using a carbonless copying system comprising a recording substrate; a transfer substrate; a first image-forming component carried by said recording substrate, which is a mixture of a binder, a pigment and a phenol/aldehyde condensation product formed by the interaction of an alkyl-substituted salicylic acid, an alkyl-substituted phenol, an aldehyde and a metal source; and a complementary image-forming component encapsulated in microcapsules carried by said transfer substrate and capable of reacting with said first image-forming component to produce a colored reaction product;
said method comprising applying pressure in selected areas upon said transfer substrate at temperatures below 40° F. to cause as colored image to form on corresponding areas of said recording substrate.

* * * * *

UNITED STATES PATENT AND TRADEMARK OFFICE
CERTIFICATE OF CORRECTION

PATENT NO. : 5,330,959

DATED : July 19, 1994

INVENTOR(S) : RABY et al.

It is certified that error appears in the above-identified patent and that said Letters Patent is hereby corrected as shown below:

Claim 2, column 10, line 31, "as" should read —a—.

Signed and Sealed this

Twenty-fifth Day of October, 1994

Attest:

BRUCE LEHMAN

Attesting Officer

Commissioner of Patents and Trademarks